United States Patent
Ivakitch et al.

(10) Patent No.: US 10,947,863 B2
(45) Date of Patent: Mar. 16, 2021

(54) METHOD TO SUPPLY OIL TO A MULTI-FILM DAMPER

(71) Applicant: PRATT & WHITNEY CANADA CORP., Longueuil (CA)

(72) Inventors: Richard Ivakitch, Scarborough (CA); David Beamish, Mississauga (CA)

(73) Assignee: PRATT & WHITNEY CANADA CORP., Longueil (CA)

( * ) Notice: Subject to any disclaimer, the term of this patent is extended or adjusted under 35 U.S.C. 154(b) by 0 days.

(21) Appl. No.: 16/657,140

(22) Filed: Oct. 18, 2019

(65) Prior Publication Data
US 2021/0025291 A1 Jan. 28, 2021

Related U.S. Application Data

(60) Provisional application No. 62/878,767, filed on Jul. 26, 2019.

(51) Int. Cl.
*F16C 27/04* (2006.01)
*F01D 25/16* (2006.01)
*F02C 7/06* (2006.01)

(52) U.S. Cl.
CPC .............. *F01D 25/164* (2013.01); *F02C 7/06* (2013.01); *F16C 27/045* (2013.01); *F05D 2240/53* (2013.01); *F05D 2260/96* (2013.01); *F16C 2360/23* (2013.01)

(58) Field of Classification Search
CPC ... F16C 27/045; F16C 2360/23; F01D 25/164
See application file for complete search history.

(56) References Cited

U.S. PATENT DOCUMENTS

| 3,304,802 | A | * | 2/1967 | Kofink | F16C 27/066 |
| | | | | | 464/180 |
| 3,499,691 | A | * | 3/1970 | Baier | F16C 32/067 |
| | | | | | 384/119 |
| 4,214,796 | A | | 7/1980 | Monzel et al. | |
| 4,289,360 | A | * | 9/1981 | Zirin | F16F 15/0237 |
| | | | | | 384/462 |
| RE31,394 | E | | 9/1983 | Streifert | |
| 4,992,024 | A | * | 2/1991 | Heydrich | F01D 25/164 |
| | | | | | 384/99 |
| 5,071,262 | A | | 12/1991 | Monzel et al. | |
| 5,207,511 | A | | 5/1993 | Bobo | |
| 5,228,784 | A | | 7/1993 | Bobo | |
| 8,342,796 | B2 | | 1/2013 | Spencer et al. | |

(Continued)

*Primary Examiner* — Phillip A Johnson
(74) *Attorney, Agent, or Firm* — Norton Rose Fulbright Canada LLP

(57) ABSTRACT

A multi-film oil damper has a housing defining an annular damper cavity having an oil inlet in communication with a source of pressurized oil. A plurality of nested damper rings is disposed within the annular damper cavity, the plurality of nested damper rings defining a plurality of squeeze film annuli. Spacer rings are disposed adjacent opposed ends of the damper rings. A contact surface of the spacer rings extends radially beyond a first cylindrical surface of an associated damper ring for engaging a second cylindrical surface of an adjacent damper ring. Recesses are defined in the second cylindrical surface of the damper rings, the recesses fluidly communicating between the squeeze film annuli and the oil inlet.

18 Claims, 6 Drawing Sheets

(56) References Cited

U.S. PATENT DOCUMENTS

| | | |
|---|---|---|
| 9,879,750 B2 | 1/2018 | Husband et al. |
| 10,077,713 B2 | 9/2018 | Gysling et al. |
| 10,233,778 B2 | 3/2019 | Gysling et al. |
| 2003/0007705 A1* | 1/2003 | Bosen .................... F16C 19/54 384/99 |
| 2009/0263057 A1* | 10/2009 | Kanki .................... B23H 9/00 384/99 |
| 2018/0128124 A1 | 5/2018 | Avis et al. |

* cited by examiner

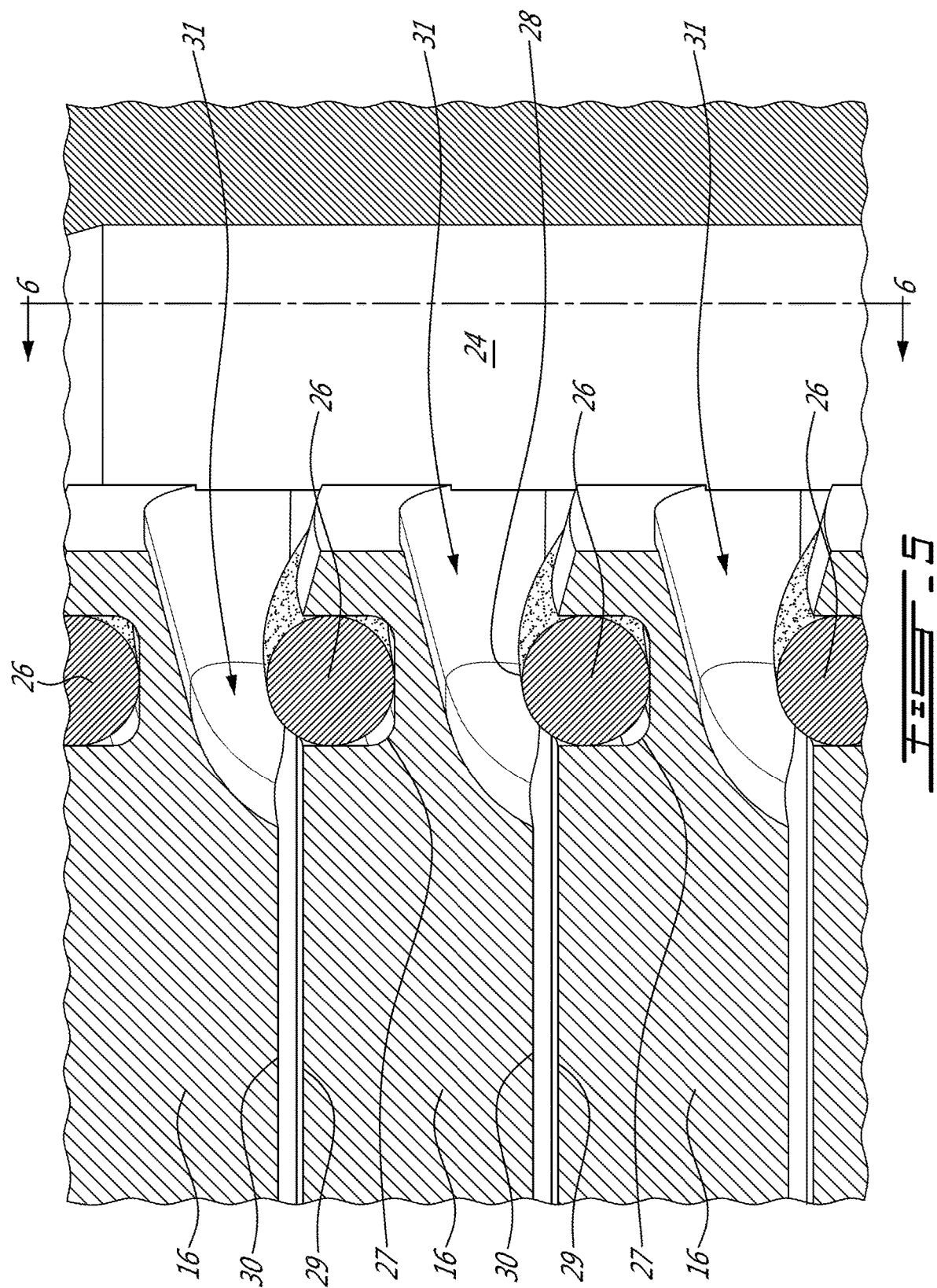

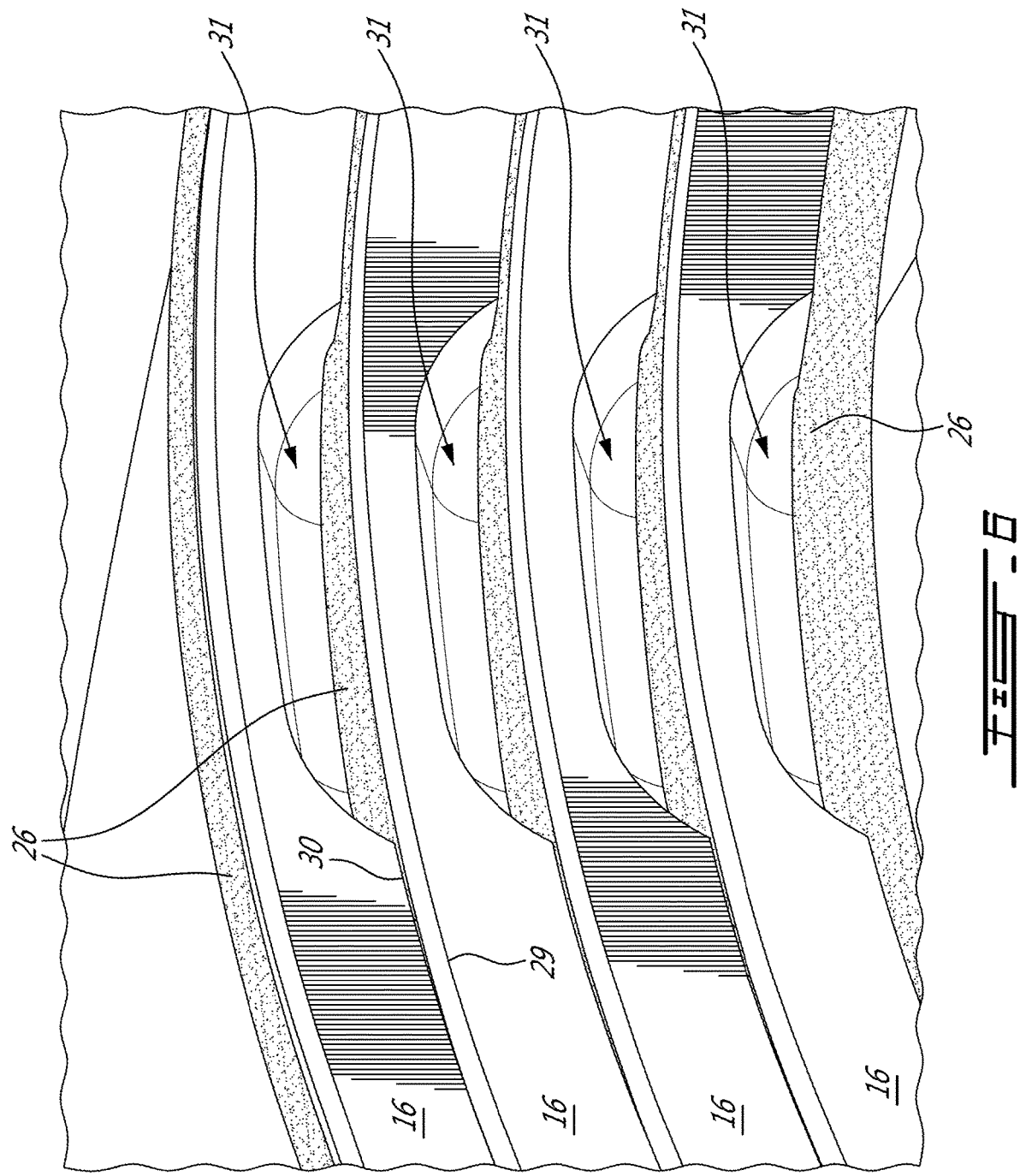

METHOD TO SUPPLY OIL TO A MULTI-FILM DAMPER

CROSS-REFERENCE TO RELATED APPLICATIONS

This application claims priority to U.S. provisional patent application No. 62/878,767 filed Jul. 26, 2019, the entire contents of which are incorporated by reference herein.

TECHNICAL FIELD

The disclosure relates to multi-film dampers and, more particularly, to a method of supplying oil to a multi-film damper.

BACKGROUND

Oil dampers or squeeze film dampers can be used to accommodate radial movement of the rotor shaft and bearings. For instance, multi-film oil dampers may be placed in a coaxial nested series with the rotor system bearing supports to provide damping to a rotor system and, thus, reduce vibrations that would otherwise be present in the system.

For proper function of an oil film damper with multiple films, each of the films between adjacent coaxial nested damper rings must be supplied with sufficient oil. In a multi-film damper, the flow of oil must fill gaps between rings to create individual oil films between each damper ring. Imbalanced rotation of the shaft and bearings will alternately compress and decompress the oil films during damping. A continuous supply flow of pressurized oil is provided to ensure that oil films are maintained.

Under certain conditions, such as during start-up, it might be challenging to provide for a continuous supply flow of pressurized oil so as to ensure that oil films are maintained. Improvement is desirable.

SUMMARY

In one aspect, the disclosure describes a multi-film oil damper in a gas turbine engine, comprising: a housing defining an annular damper cavity having an oil inlet in communication with a source of pressurized oil; a plurality of nested damper rings disposed within the annular damper cavity, the plurality of nested damper rings defining a plurality of squeeze film annuli, the nested damper rings having respective radially inner cylindrical surfaces and radially outer cylindrical surfaces, and at least one recess defined in the respective radially outer cylindrical surfaces of the plurality of nested damper rings communicating between the squeeze film annuli and the oil inlet; spacer rings disposed adjacent opposed ends of associated damper rings of the plurality of nested damper rings, a contact surface of the spacer rings extending radially outward of the radially outer cylindrical surface of an associated damper ring of the plurality of nested damper rings and engaging the radially outer cylindrical surface of an adjacent damper ring of the plurality of nested damper rings.

In a further aspect, the disclosure describes a method of supplying oil to a multi-film oil damper comprising: providing a plurality of coaxial nested outer damper rings disposed in an oil damper cavity of the bearing housing and sealed with an inner damper ring, flooding the oil damper cavity with oil via an oil inlet; spacing the coaxial nested outer damper rings apart with spacer rings to define oil filled gaps there between; and providing a recess in each outer damper ring adjacent the spacer ring to fluidly communicate between the oil filled gap and the oil inlet. Embodiments can include combinations of the above features.

Further details of these and other aspects of the subject matter of this application will be apparent from the detailed description included below and the drawings.

DESCRIPTION OF THE DRAWINGS

FIG. 5 is a detail view of an axial end of the damper rings with spacers and recesses between the coaxial damper rings of FIGS. 3-4.

FIG. 6 is a view along line 6-6 of FIG. 5 showing the recesses aligned radially.

DETAILED DESCRIPTION

Figure 1:
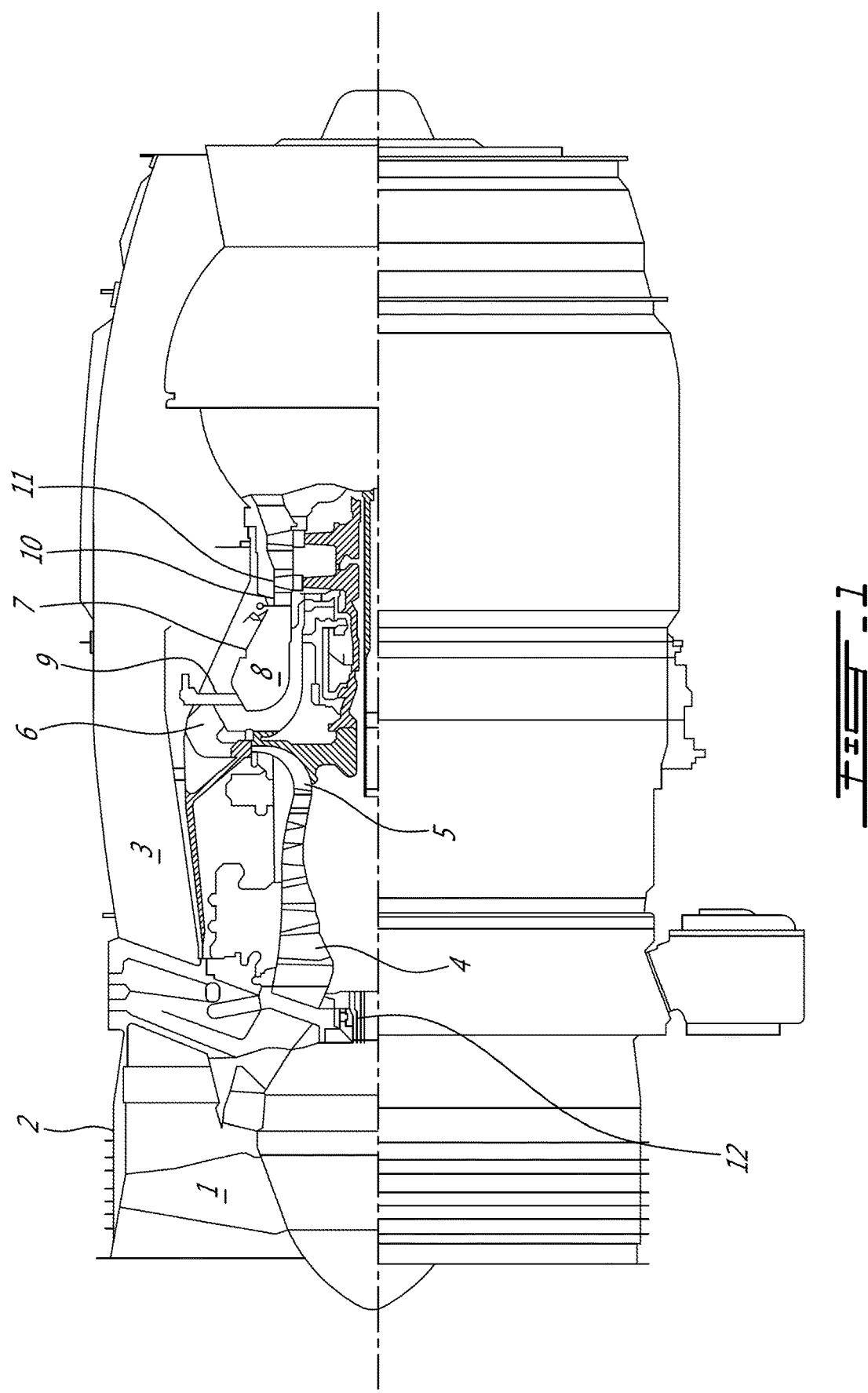
FIG. 1 shows an axial cross-section view of a turbofan engine.

FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

Figure 2:
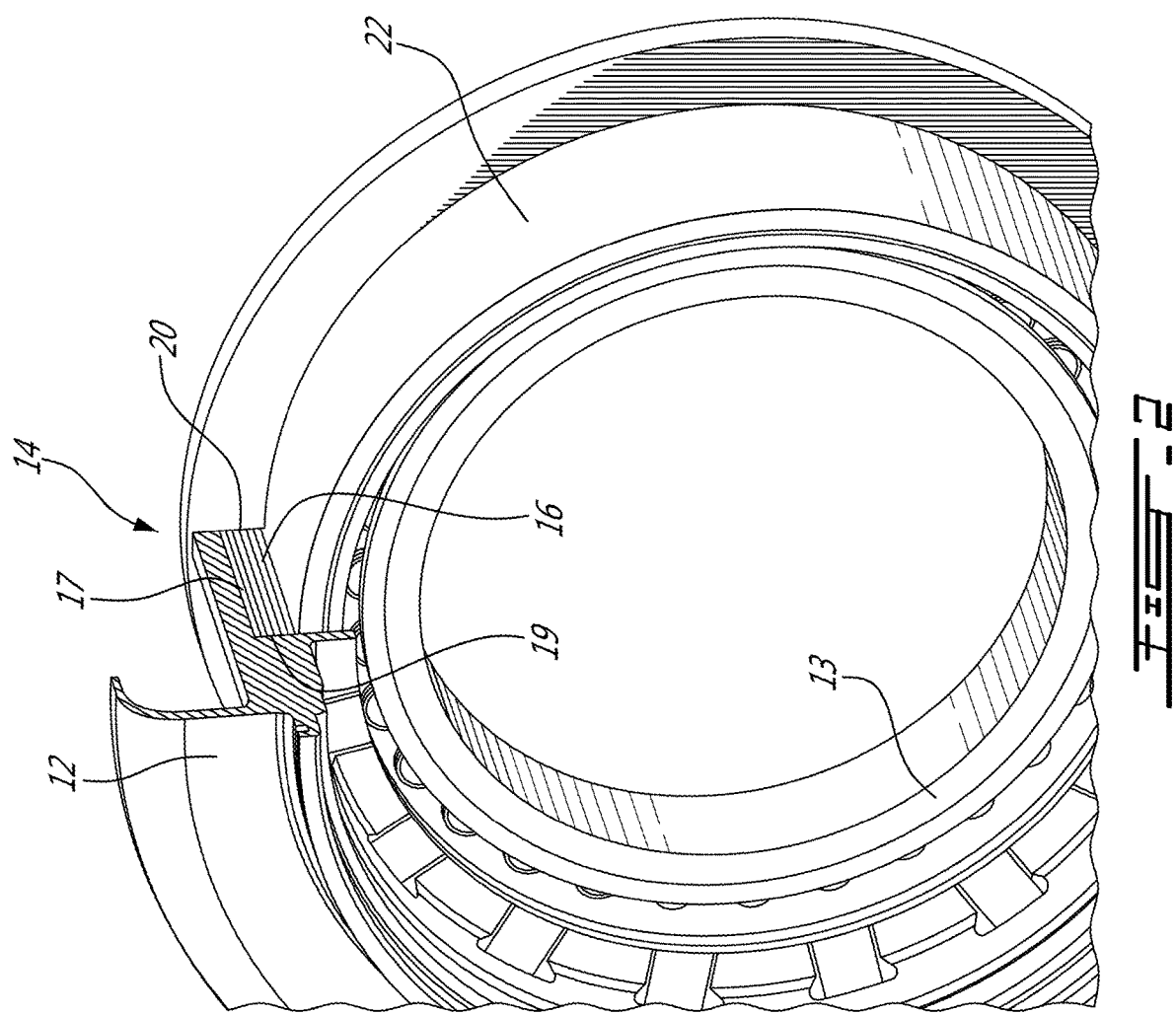
FIG. 2 is a partial cutaway isometric view of an example multi-film oil damper and roller bearing.

FIG. 1 shows a forward bearing housing 12 that supports the low pressure spool shaft (15-see FIG. 3) with roller bearings 13 (see FIG. 2). FIG. 2 shows an isometric partial cutaway view of an example of a multi-film oil damper 14 coaxially outward of the roller bearing 13.

Figure 3:
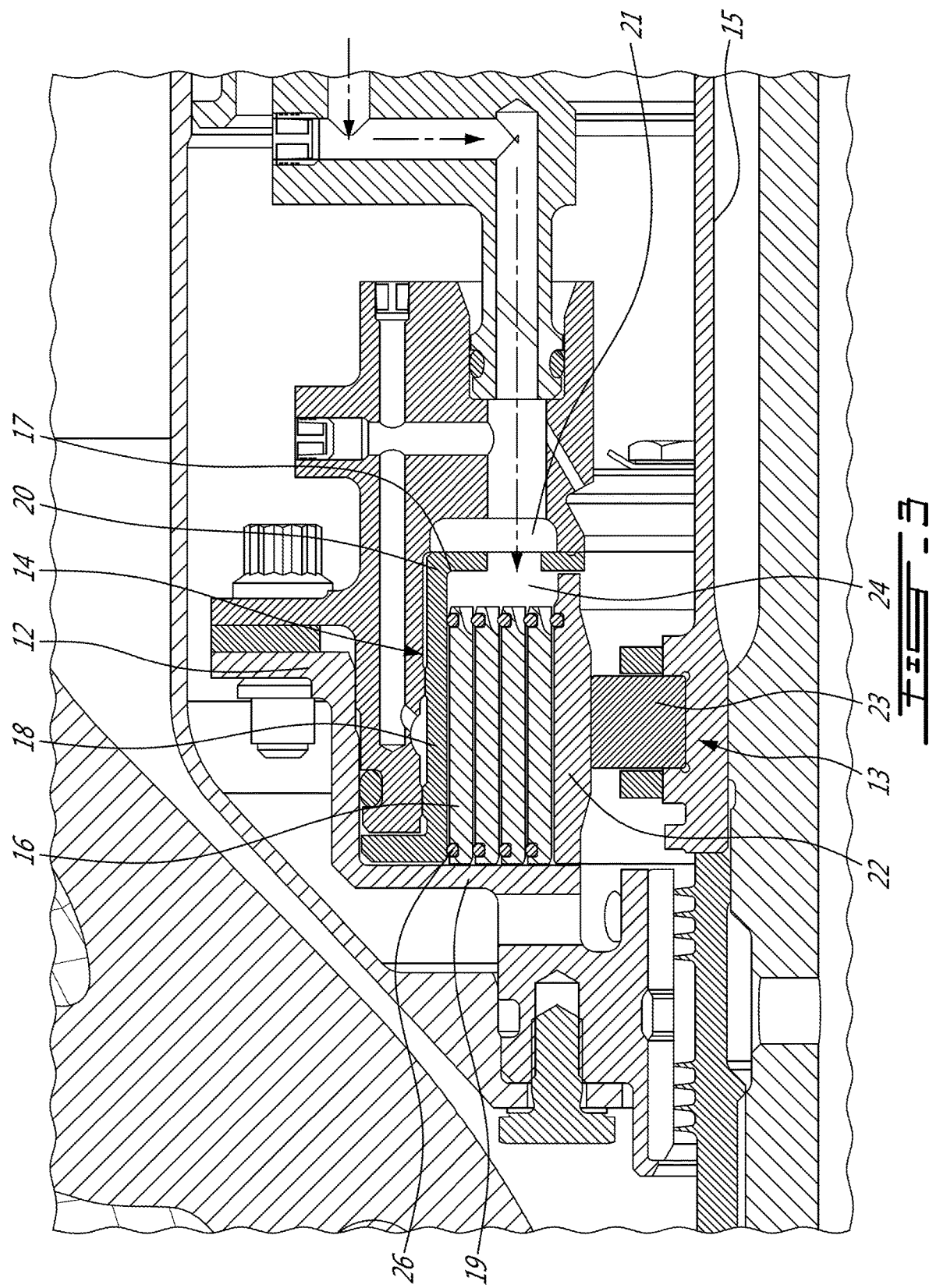
FIG. 3 is a sectional view through a multi-film damper along an axial radial plane.

FIG. 3 shows a sectional view along an axial radial plane through a multi-film damper 14 in accordance with the present description. The multi-film oil damper 14 accommodates radial movement of the rotary shaft 15 and roller bearing 13 relative to a bearing housing 12 as a result of the damping action of oil films between the outer damper rings 16.

The multi-film oil damper 14 includes an annular damper cavity 17 defined within the bearing housing 12 between a radially outward wall 18, a first radially extending side wall 19 and a second radially extending side wall 20. The annular damper cavity 17 has an oil inlet 21 in the second side wall 20. The oil inlet 21 is in communication with a source of pressurized oil such as an engine oil circulating pump (not shown) which directs pressurized oil as indicated by dashed arrows in FIG. 3.

Figure 4:
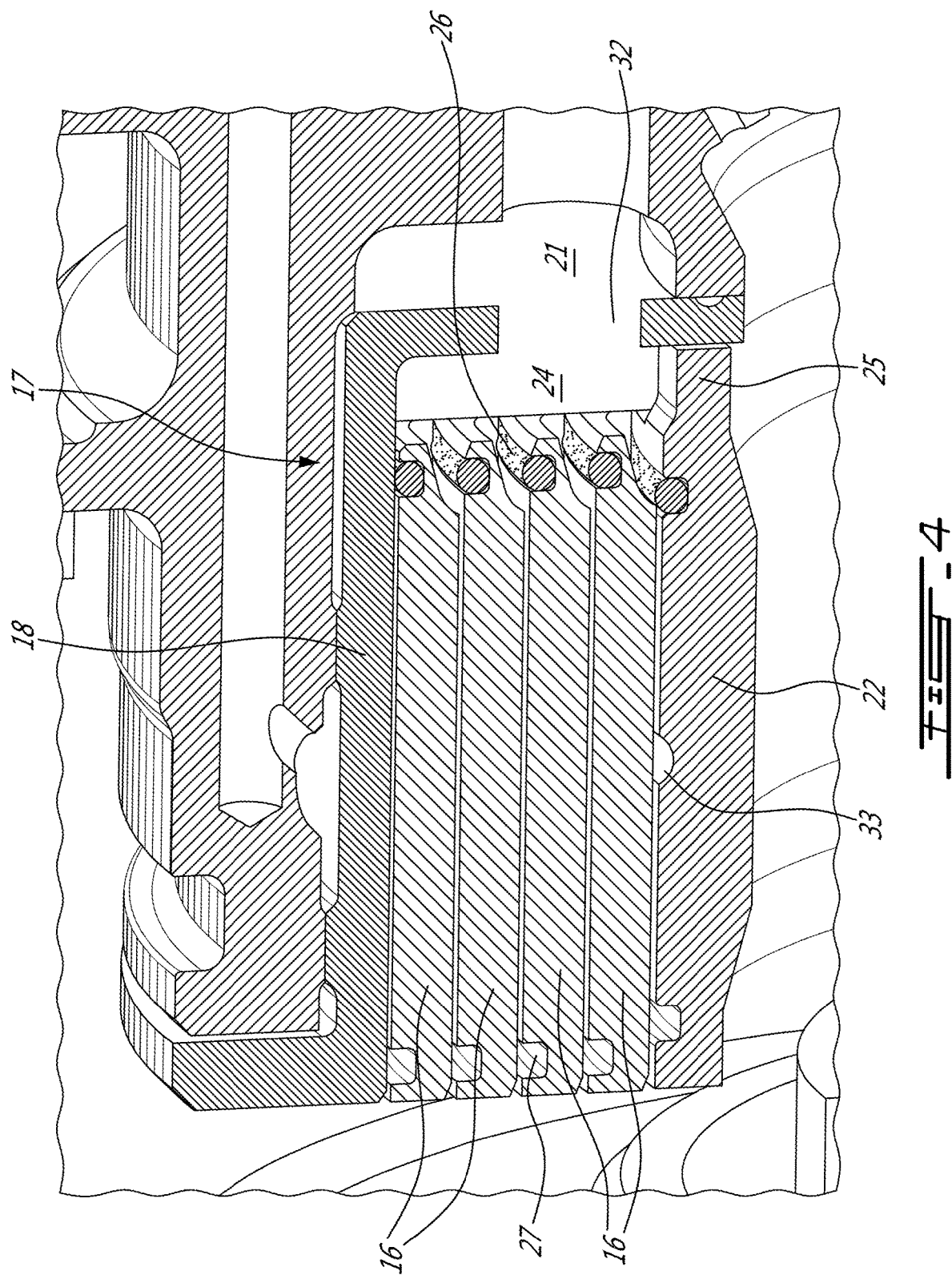
FIG. 4 is a detailed axial radial sectional view of the multi-film damper of FIG. 3.

As seen in FIGS. 2 and 3, an inner damper ring 22 has axial ends abutting the first radially extending side wall 19 and the second radially extending side wall 20 of the annular damper cavity 17. The inner damper ring 22, in the embodiment shown, serves both as an outer race for the rollers 23 of the bearings 13 and to contain the pressurized oil within the annular damper cavity 17. As seen in FIGS. 3 and 4, the inner damper ring 22 can include an oil drainage channel 33. The axial ends of the inner damper ring 22 are radially slidingly sealed with the first and second radially extending side walls 19, 20 of the annular damper cavity 17 to contain the oil. A one way oil flow is directed from the oil inlet 21 through the damper cavity to the drainage channel 33.

FIG. 3 shows an optional oil filled gallery 24 as part of the oil inlet 21. As seen in FIG. 4, the oil filled gallery 24 is a radially extending slot which also receives an anti-rotation tab 25 extending axially from the inner damper ring 22. The axial ends of the innermost ring 12 and the remaining nested damper rings 16 abut the second radially extending side wall 20 apart from the oil filled gallery 24.

Referring to FIG. 4, the damper rings 16 are coaxially nested between the innermost damper ring 22 and the radially outward wall 18. Each damper ring 16 has axial ends adjacent the first and second radially outward walls 19, 20 of the annular damper cavity 17. The damper rings 16 have respective first cylindrical surfaces and second cylindrical surfaces coated with an oil film.

The penetration of oil between damper rings can be inhibited by inertia and by the surface tension of the oil coating the adjacent ring surfaces which can cause the rings sticking together. Especially during start-up of the pressurized oil circulating system, there may be difficulty in oil passing between damper rings. As a result oil film formation may be impeded.

Referring to FIGS. 3, 4, 5 and 6, a spacer ring 26 is disposed at each axial end of each damper ring 16. FIG. 4 does not show the spacer ring 26 on the left axial end in order to reveal the annular slot 27 in which the spacer ring 26 is retained. FIG. 3 shows spacer rings 26 on both axial ends of each outer damper ring 16. The spacer rings 26 serve to separate the damper rings 16 thereby providing a gap or annulus that can be filled with oil flow under pressure and create the oil film between adjacent coaxial nested damper rings 16. The spacer rings 26 can include an elastomeric O-ring if operating temperatures permit or a resilient split metal ring.

Referring to FIG. 5 an external contact surface 28 of each spacer ring 26 extends radially beyond the first surface 29 of an associated outer damper ring 16. In other words, the diameter of the spacer ring 26 is larger than the depth of the annular slot in which the spacer ring 26 is retained. The contact surface 28 of each outer damper ring 16 engages the second surface 30 of an adjacent outer damper ring 16 defining an oil filled gap therebetween.

As best seen in FIG. 6 in conjunction with FIG. 5, to permit oil to flow past the spacer rings 26 and fill the annuli between outer damper rings 16, a recess 31 is disposed in the second surface 30 of the adjacent outer damper ring 16. Accordingly, the recess 31 fluidly communicates between the oil filled gap and the oil inlet 21. The recesses 31 have a circumferential arc length and are aligned radially with the oil filled gallery 24 of the oil inlet 21 as seen in FIGS. 4 and 6. Optionally, as seen in FIG. 4, the oil inlet 21 can include a flow restrictor opening 32 to control oil flow and pressure between the oil inlet 21 and the recesses 31.

The above description and drawings describe the method of supplying oil to the multi-film oil damper 14 as follows. A plurality of coaxial nested outer damper rings 16 are disposed in an oil damper cavity 17 of the bearing housing 12 and sealed with the inner damper ring 22. The oil damper cavity 17 is flooded with oil via the oil inlet 21 which optionally includes an oil filled gallery 24. The coaxial nested damper rings 16 are spaced apart with spacer rings 26 to define oil filled gaps there between. A recess 31 in each outer damper ring 16 adjacent the spacer ring 26 fluidly communicates between the oil filled gaps between outer damper rings 16 and the oil inlet 21. Accordingly the recesses 31 permit oil to enter the gaps between damper rings 16 while the spacer rings 26 maintain an adequate gap.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A multi-film oil damper in a gas turbine engine, comprising:
   a housing defining an annular damper cavity having an oil inlet in communication with a source of pressurized oil;
   a plurality of nested damper rings disposed within the annular damper cavity, the plurality of nested damper rings defining a plurality of squeeze film annuli, the nested damper rings having respective radially inner cylindrical surfaces and radially outer cylindrical surfaces, and at least one recess defined in the respective radially outer cylindrical surfaces of the plurality of nested damper rings communicating between the squeeze film annuli and the oil inlet;
   spacer rings disposed adjacent opposed ends of associated damper rings of the plurality of nested damper rings, a contact surface of the spacer rings extending radially outward of the radially outer cylindrical surface of an associated damper ring of the plurality of nested damper rings and engaging the radially inner cylindrical surface of an adjacent damper ring of the plurality of nested damper rings.

2. The multi-film oil damper according to claim 1 wherein the respective radially outer cylindrical surfaces of the plurality of nested damper rings have annular grooves for receiving the spacer rings.

3. The multi-film oil damper according to claim 1 wherein the recesses have a circumferential arc length.

4. The multi-film oil damper according to claim 3 wherein the recesses are aligned radially.

5. The multi-film oil damper according to claim 3 wherein the annular damper cavity is bounded by a first radially extending side wall and a second radially extending side wall, and wherein the oil inlet includes an inlet gallery recessed axially within the second radially extending side wall and radially aligned with the recesses.

6. The multi-film oil damper according to claim 5 wherein the oil inlet includes a flow restrictor between the inlet gallery and the recesses.

7. The multi-film oil damper according to claim 5 wherein an innermost one of the plurality of nested damper rings has an oil drainage channel.

8. The multi-film oil damper according to claim 7 wherein the innermost damper ring has an anti-rotation tab engaged in the inlet gallery.

9. The multi-film oil damper according to claim 7 wherein the innermost damper ring is an outer race of a rotary shaft bearing.

10. The multi-film oil damper according to claim 1 wherein the spacer rings are selected from a group consist of: elastomeric O-rings and metal split rings.

11. The multi-film oil damper according to claim 1 wherein an innermost one of the plurality of nested damper rings has an oil drainage channel, and wherein the innermost damper ring has axial ends radially slidingly sealed with a first radially extending side wall and a second radially extending side wall of the annular damper cavity.

12. A multi-film oil damper for accommodating radial movement of a rotary shaft bearing relative to a bearing housing, the multi-film oil damper comprising:
a plurality of coaxial nested damper rings disposed in an oil damper cavity of the bearing housing and sealed with an inner damper ring, the oil damper cavity having an oil inlet;
the plurality of coaxial nested damper rings having respective spacer rings disposed at opposed axial ends thereof within a first cylindrical surface and having a recess within a second cylindrical surface, the recess fluidly connected to oil filled gaps between the plurality of coaxial nested damper rings and the oil inlet.

13. The multi-film oil damper according to claim 12 wherein the first cylindrical surface has annular grooves at the opposed axial ends for receiving the spacer rings.

14. The multi-film oil damper according to claim 12 wherein the recess has a circumferential arc length.

15. A method of supplying oil to a multi-film oil damper comprising:
providing a plurality of coaxial nested damper rings disposed in an oil damper cavity,
flooding the oil damper cavity with oil via an oil inlet;
spacing the coaxial nested outer damper rings apart with spacer rings to define oil filled gaps therebetween; and
providing a recess in respective ones of the plurality of coaxial nested damper rings adjacent the spacer rings to fluidly communicate between the oil filled gaps and the oil inlet.

16. The method according to claim 15 comprising forming the recess as a cutout having a circumferential arc length.

17. The method according to claim 16 comprising radially aligning the recesses of the respective ones of the plurality of coaxial nested damper rings.

18. The method according to claim 17 comprising providing the oil inlet with an oil gallery aligned with the recesses.

* * * * *